Figure 1:
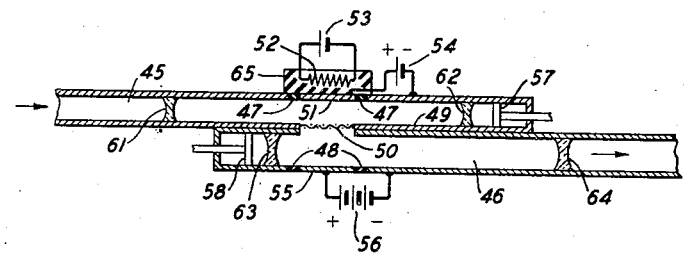

April 8, 1947.   A. L. SAMUEL   2,418,484
FREQUENCY MULTIPLYING SYSTEM
Original Filed May 3, 1941

INVENTOR
A. L. SAMUEL
BY Franklin Mohr
ATTORNEY

Patented Apr. 8, 1947

2,418,484

UNITED STATES PATENT OFFICE 2,418,484

FREQUENCY MULTIPLYING SYSTEM

Arthur L. Samuel, Summit, N. J., assignor to Bell Telephone Laboratories, Incorporated, New York, N. Y., a corporation of New York Original application May 3, 1941, Serial No. 391,658. Divided and this application October 10, 1942, Serial No. 461,517

1 Claim. (Cl. 250—36)

This invention relates to methods of and apparatus for utilizing the interaction between electron streams and electromagnetic waves within wave guides, and is particularly applicable to a frequency converting system.

An object of the invention is to increase the efficiency of coupling of electronic energizing systems to wave guides.

Another object of the invention is to cause a section of a wave guide to serve as a negative resistance with respect to waves traversing it, whereby the wave guide section may function as an amplifier.

A feature of the invention lies in the incorporation of an electronic device such as an amplifier entirely within the compass of the wave guide. The device so incorporated is protected by the wall of the wave guide and if the wall is of conductive material, the device is shielded thereby from incoming or outgoing radiations.

Another feature is the use of a wave guide of rectangular section the width of which may be chosen to effect a desired cut-off frequency while the thickness or depth of the guide may be chosen to effect a desired degree of spacing between a pair of electrodes of the electronic device, independently of the width of the guide.

This application is a division of my copending application, Serial No. 391,658, filed May 3, 1941, Patent No. 2,402,184, issued June 18, 1946.

Figure 2:
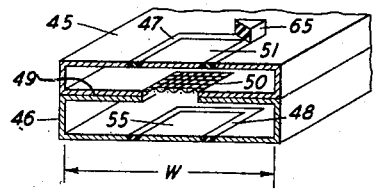
Figure 3:
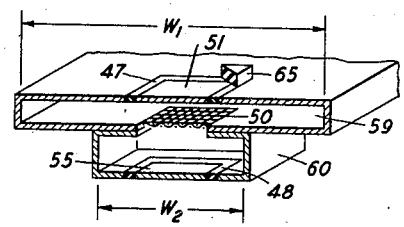

In the drawings:

Figs. 1 and 2 show, respectively, a longitudinal and a transverse section of an arrangement for coupling two wave guides through an electronic amplifier; and Fig. 3 is a cross-sectional view of an arrangement whereby a wave of fundamental frequency in one wave guide may be utilized to set up a wave of a higher or harmonic frequency in a wave guide of smaller dimensions.

In Figs. 1 and 2, two partially overlapping wave guides 45 and 46 are shown with a common wall portion 49. The guides are preferably rectangular in cross section and in the case of an amplifier both guides may well have the same transverse dimension or width W, as indicated in Fig. 2. In the common wall 49 there is situated an electron permeable region or grid 50 opposite which in the guide 45 is a thermionically active cathode section 51 insulated from the wall of the guide by insulation 47 or otherwise suitably mounted. Vacuum seals are provided, as at 61, 62, 63 and 64. The cathode may be heated by an external heating element 52 insulated as at 65 and energized by a battery 53. The cathode may be positively polarized with respect to the grid 50 by means of a polarizing battery 54. Opposite the grid 50 in the guide 46 may be mounted an anode 55 insulated from the wall of the guide by insulation 48 and polarized positively with respect to the grid 50 by means of a battery 56. Each of the batteries above mentioned may be replaced by any suitable source of electromotive force. Adjustable pistons or reflectors 57 and 58 are provided for controlling the establishment of standing wave patterns. An incoming wave in the guide 45 serves to impress a control voltage between the cathode 51 and the grid 50 thereby producing a variable electron current in the region between the grid 50 and the anode 55, the variations of which current serve to set up amplified electromagnetic waves in the guide 46. The mode of operation of the device is generally similar to that described in United States Patent 2,153,728, issued April 11, 1939, to G. C. Southworth.

Fig. 3 is a cross-sectional view of a modification of the arrangement of Figs. 1 and 2 adapted for frequency conversion. In this arrangement the incoming wave guide, shown at the top, is of a suitable width (horizontal dimension) to support a wave of a desired fundamental frequency. The output wave guide, shown below the incoming guide, is narrower so that it will not support a wave of the fundamental frequency but it may be tuned to the harmonic frequency. The vertical dimensions of the respective guides in Figs. 1, 2 and 3 may be determined by the relative spacings desired between the grid and the cathode on the one hand and between the grid and the anode on the other.

In Fig. 3 the wave guide for the fundamental frequency is designated 59 and the guide for the harmonic 60, the widths of the respective guides being $W_1$ and $W_2$.

What is claimed is:

A pair of wave guides each of rectangular cross section, said guides partially overlapping longitudinally upon their respective wider sides with a common wall in said overlapping portion, said common wall having an electron permeable region, a source of waves of a given fundamental frequency, one of said wave guides being wide enough to freely transmit waves of said fundamental frequency and the other guide being materially narrower than said one guide in such proportion that the narrower guide will freely transmit a given harmonic of said fundamental frequency while substantially suppressing said fundamental frequency, cathode means in said wider guide opposite the electron permeable section of said common wall, and anode means in said narrower guide opposite said electron permeable region, said cathode means and said anode means being integral with the non-common wall portions of the respective guides parallel to said electron permeable common wall and the thickness of each guide being determined by an optimum spacing between the respective electrodes.

ARTHUR L. SAMUEL.